(12) United States Patent
Moreno et al.

(10) Patent No.: US 6,915,411 B2
(45) Date of Patent: Jul. 5, 2005

(54) SIMD PROCESSOR WITH CONCURRENT OPERATION OF VECTOR POINTER DATAPATH AND VECTOR COMPUTATION DATAPATH

(75) Inventors: Jamie H. Moreno, Dobbs Ferry, NY (US); Jeffrey Haskell Derby, Chapel Hill, NC (US); Uzi Shvadron, Mitzpe Aviv (IL); Fredy Daniel Neeser, Langnau am Albis (CH); Victor Zyuban, Yorktown Heights, NY (US); Ayal Zaks, Misgav (IL); Shay Ben-David, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 10/197,733

(22) Filed: Jul. 18, 2002

(65) Prior Publication Data

US 2004/0015677 A1 Jan. 22, 2004

(51) Int. Cl.$^7$ .............................................. G06F 15/80
(52) U.S. Cl. ................... 712/22; 712/4; 712/7; 712/222
(58) Field of Search ......................... 712/4, 7, 22, 222

(56) References Cited

U.S. PATENT DOCUMENTS

| | | | | |
|---|---|---|---|---|
| 5,669,010 A | * | 9/1997 | Duluk, Jr. .................... | 712/22 |
| 5,850,227 A | * | 12/1998 | Longhenry et al. ......... | 345/671 |
| 6,665,790 B1 | * | 12/2003 | Glossner et al. ............... | 712/4 |
| 2004/0006681 A1 | * | 1/2004 | Moreno et al. ................ | 712/4 |

\* cited by examiner

Primary Examiner—Kenneth S. Kim
(74) Attorney, Agent, or Firm—Robert M. Trepp; F. Chau & Associates, LLC

(57) ABSTRACT

A digital signal processor (DSP) includes a SIMD-based organization wherein operations are executed on a plurality of single-instruction multiple data (SIMD) datapaths or stages connected in cascade. The functionality and data values at each stage may be different, including a different width (e.g., a different number of bits per value) in each stage. The operands and destination for data in a computational datapath are selected indirectly through vector pointer registers in a vector pointers datapath. Each vector pointer register contains a plurality of pointers into a register file of a computational datapath.

35 Claims, 2 Drawing Sheets

SIMD PROCESSOR WITH CONCURRENT OPERATION OF VECTOR POINTER DATAPATH AND VECTOR COMPUTATION DATAPATH

BACKGROUND OF THE INVENTION

1. Field of the Invention

The present invention relates generally to digital signal processing systems and, more particularly, to an improved digital signal processor architecture.

2. Background of the Invention

Digital signal processing is characterized by operating on sets of data elements which are continuously evolving in time. These data sets correspond to the digital representation of signals in the analog domain, and are referred to as vectors. Digital signal processing algorithms are characterized by frequently performing the same computation on each of the elements in a vector. For example, a filtering algorithm may multiply each element in a vector by a different factor, and accumulate the partial results into a single final result.

Elementary signal processing algorithms, known as signal processing kernels, are characterized by the execution of sequences of operations on the vector elements. As stated above, one example is the execution of multiplication followed by the execution of accumulation. In regard to the execution of such sequence of operations, the state of the art in the implementation of digital signal processors includes either performing a sequence of operations using the same arithmetic/logic unit for as many times as the number of operations in the sequence (e.g., a multiplication operation in one cycle followed by an accumulation operation in the next cycle), or structuring the hardware as a pipeline in which operands enter at one end, with the operations being performed as the data flows through the pipeline, and results obtained at the other end of the pipeline (e.g., a multiply-add pipeline).

A significant limitation in the state of the art, in particular the pipeline approach mentioned above, is the restricted flexibility for performing the operations that compose the signal processing kernels, due to the conventional pipeline organization. The schemes in the state of the art do not allow for intermediate results to be collected for processing further down in the pipeline, perhaps in a different order in which the intermediate results are generated, or for changing the sequence of operations in the pipeline at some arbitrary points in time. These limitations require more complex sequences of instructions and usually require more execution cycles, thereby restricting the maximum performance that can be obtained from the functional units.

For the purposes of executing digital signal processing algorithms on a programmable processor, the vectors of data elements may be grouped into smaller subsets, for example, of four elements per subset, and computations can be performed simultaneously (in parallel) on all the elements of the subset. Two alternative schemes are currently used for grouping the data elements and specifying such operation.

In the first approach, the data elements in one subset of a vector are located in separate registers, and a different instruction specifies the operation performed on each of the elements. Although multiple instructions are used to specify the operations performed simultaneously on the data elements, all these instructions correspond to a single program flow, and thus are treated as a single entity. This approach is known as Very-Long Instruction Word (VLIW), referring to the case wherein a single very long instruction word contains a plurality of basic instructions. In the case of computations for a subset of a vector, all the basic instructions are identical because the same operation is performed on all the data elements; the only difference among these basic instructions is the location of operands and results. This approach is used in various digital signal processors, such as the C64 from Texas Instruments Inc., SC140 from StarCore, and ADSP 2116x from Analog Devices, Inc.

In the second approach, all the data elements in one subset of a vector are located in the same register ("wide register"), and a single instruction specifies the operation performed on all such elements. This approach is known as Single Instruction, Multiple Data (SIMD) with subword parallelism. The term SIMD refers to the use of only one instruction for all the operations, whereas the term subword parallelism refers to the concatenation of multiple data elements in the same register. This approach is used in various multimedia and signal processing-oriented microprocessor extensions, such as MMX from Intel Corporation and ALTIVEC from Motorola. Inc.

These approaches suffer from various limitations. In particular, the use of SIMD with subword parallelism requires placing the data elements in the right order within the wide registers, and further requires mechanisms to move the data elements around as needed. These requirements translate into additional hardware resources and execution cycles. On the other hand, the use of the VLIW approach requires coding multiple instructions that perform the same operation, thus leading to longer instructions (the so-called VLIWs), which tend to require more space in instruction memory.

SUMMARY OF THE INVENTION

The present invention is directed to an improved digital signal processor architecture.

In various embodiments of the present invention, a method-for processing digital signal information employs a processor having a plurality of datapaths connected in cascade, the plurality of datapaths including at least one vector pointers datapath and at least one vector computational datapath. A SIMD instruction may be executed in a vector pointers datapath for determining operands and data destination of at least one instruction to be executed in at least one of the vector computational datapaths. At the same time, SIMD instructions may be executed in the vector computational datapaths.

Each of the vector pointers datapaths and vector computational datapaths may include its own register file. Results of a SIMD instruction executed in a vector pointers datapath may be stored in the register file of this datapath. These results may include a plurality of indexes into a register file of a vector computational datapath.

SIMD instructions executed in the vector pointers datapath may be either an explicit operation or an implicit operation. In the case of an explicit operation, the operation may include an arithmetic or a logic operation using at least one register of the register file of the vector pointers datapath. Furthermore, an explicit operation may also use other operands obtained from other registers, either scalar or with multiple elements, from other register file structures in at least one vector pointers datapath. An explicit operation may also include an arithmetic or a logic operation using two registers from the register file of a vector pointers datapath. In the case of an implicit operation, the operation may be an update operation that adds a value to each element of a register from a register file of a vector pointers datapath. The value added to each of the elements is a constant or a value specified by an instruction. Furthermore, an implicit operation may include an arithmetic or a logic operation that uses content of a register from a register file of a vector pointers datapath as a first operand and an implicit value, an explicit value, or the content of a specific register as the second operand.

The vector pointers datapath may be configured to enable the management of circular buffers for a register file of a vector computational datapath.

The width of a first vector computational datapath may differ from the width of a second vector computational datapath. The width of the first vector computational datapath may be less than the width of the second vector computational datapath. For example, the width of a first vector computational datapath may be 16 bits while the width of a second vector computational datapath is 40 bits.

Results from operations performed in a first vector computational datapath may be placed in a register file of a second vector computational datapath. The results placed in the register file of the second vector computational datapath may be operated upon in the second vector computational datapath. These results may be zero-extended or sign-extended to have a bit-length equal to the width of the second vector computational datapath.

Furthermore, results of an operation performed in the second vector computational datapath may be transferred to memory. Alternatively, results of an operation performed in the second vector computational datapath may be transferred to a register file of the first vector computational datapath. Data transferred to memory or to the register file of the first vector computational datapath may be size reduced, which may include at least one of saturation, rounding, truncation, and bits extraction.

The register file of a vector computational datapath may be a multiported register file with arbitrary addressing and whose content are accessed indirectly using a register from a register file of the vector pointers datapath.

Register files may be organized as a plurality of register banks. Each of the register banks may be connected to a functional unit.

Dedicated hardware may be used to combine a plurality of values into a single result placed into a dedicated register.

Datapaths may be controlled by a single long-instruction word (LIW). All basic instructions in one LIW may be fetched and issued for execution at the same time.

The plurality of datapaths may be controlled by a plurality of instructions, each of which is dispatched for execution only when the resources required by the instruction are available. Interlocking mechanisms may be used to detect when the resources required by the instruction, including results generated by earlier instructions, are available.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
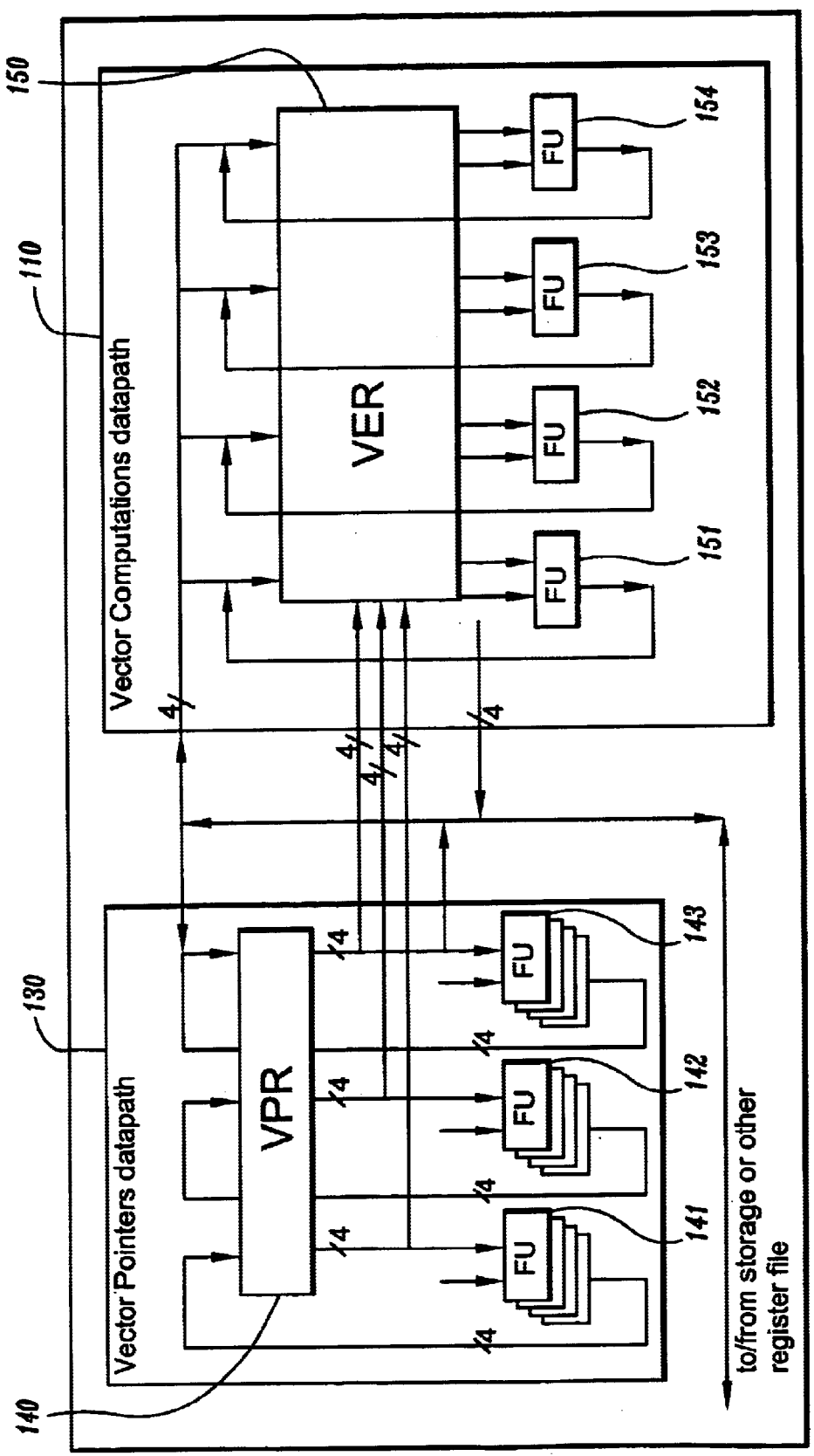
FIGS. 1 and 2 illustrate exemplary digital signal processor architectures according to embodiments of the present invention.

The invention described in copending application "Digital Signal Processor with Cascaded SIMD Organization," U.S. application Ser. No. 10/456,793, which claims priority from a provisional application filed on Jun. 26, 2002, which is incorporated by reference herein in its entirety, partially solves some of the limitations mentioned above by providing a digital signal processor (DSP) organization wherein two SIMD units are connected in cascade, and wherein the results computed in the first SIMD stage of the cascade are stored into the register file of the second SIMD stage in the cascade.

In this arrangement, each SIMD stage contains its own resources for storing operands and intermediate results (e.g., its own register file), as well as for decoding the operations that can be executed in the stage. Within each stage, the hardware resources are organized to operate in SIMD manner, so that two independent SIMD operations can be executed simultaneously, one in each stage of the cascade. Intermediate operands and results flow through the cascade, are stored in the register files of the two stages, and are used from those register files. Data is brought from memory directly into the register files of both stages, and are used from those register files. Such an invention may also exploit an arbitrary vector addressing technique, providing even further flexibility in the selection of the operands that are used in the SIMD stages of the cascade of functional stages, as well as in the selection of the location for placing data in the register files.

Although the invention described therein provides more computing flexibility than the prior art as a result of the two SIMD stages connected in cascade, and more data manipulation functionality arising from the use of arbitrary vector addressing, it still has significant drawbacks in the manipulation of data due to the restricted capabilities for moving data across the SIMD stages, as well as due to the restricted capabilities for manipulating the contents of the pointer registers that are used to access the contents of the register file.

For a digital processing system, the present invention provides a SIMD-based organization wherein operations are executed on a plurality of single-instruction multiple data (SIMD) datapaths or stages connected in cascade. The functionality and data values at each stage may be different, including a different width (e.g., a different number of bits per value) in each stage.

The SIMD stages or datapaths perform a plurality of operations simultaneously on a plurality of operands. Without loss of generality, the description of the invention assumes that a plurality of operations are performed simultaneously in each SIMD datapath or datapath subsection. Without loss of generality as well, the description of the invention assumes that there are two SIMD datapaths, called the Vector Pointers Datapath and the Vector Computations Datapath. However, the Vector Computations Datapath could itself comprise a plurality of SIMD stages, with different functionality and data values at each stage. Furthermore, without loss of generality as well, although the description of the invention depicts four operations performed simultaneously in the Vector Computational Datapath, it should be appreciated that the exact number of operations performed at a particular stage may be more or less than the number mentioned in the description and depicted in the accompanying drawings.

Referring to FIG. 1, a Vector Computations Datapath 110 performs a plurality of operations in SIMD fashion on data values obtained from a register file, herein called Vector Element Register File (VER) 150, generating a plurality of results. The VER 150 is capable of delivering 8 operands and receiving 4 values every cycle, and includes a register file structure that enables indirect access to a large number of operands used in the Vector Computations Datapath 110.

Each functional unit (FU) 151–154 within the Vector Computations Datapath 110 comprises, for example, an arithmetic-logic unit (ALU) that performs arithmetic, logic, shift, bit manipulation, or select operations on the contents of the VER 150. In the configuration shown in FIG. 1, four data elements can be transferred into the VER 150 from an external source, such as memory or another register file, and four data elements can be transferred from the VER 150 to another register file or memory.

As shown in FIG. 1, a Vector Pointers Datapath 130 is connected to the Vector Computations Datapath 110. The Vector Pointers Datapath 130 may use the arbitrary vector addressing technique disclosed in "Vector Register File with Arbitrary Addressing," U.S. patent application Ser. No. 09/514,497, filed Feb. 29, 2000, which is incorporated by reference in its entirety. The use of indirect addressing allows delivering many such operands and receiving results without being constrained by encoding space in the instructions, because the instructions specify a single register containing pointers to each set of four operands, instead of the address of the operands themselves.

Advantageously, the sets of data used by an instruction may be selected arbitrarily among any of the registers in the VER 150, in any order, as specified by the contents of Vector Pointer Registers (VPR) 130. As shown, each vector pointer register (within the VPR 140) contains four indexes into the VER 150, thereby allowing selection of four arbitrary registers in the VER 150. Two of these vector pointer registers are used to read data from the VER 150, and a third vector pointer register is used to specify where to place data into the VER 150.

The Vector Pointers Datapath 130 operates on values whose size (number of bits) is determined by the number of entries in the VER 150. In other words, the range of each operand in the Vector Pointers Datapath 130 should be large enough to access any of the registers in the VER 150. The VPR 140 provides the indexes used to access the contents of the VER 150.

The Vector Pointers Datapath 130 performs up to three SIMD operations, with four primitive operations per SIMD operation, on data values obtained from the VPR 140, generating up to 12 results. The VPR 140 is capable of delivering up to 12 operands and receiving up to 12 values every cycle. The operands read from the VPR 140 can be grouped as four values concatenated in the same register, so that only three read ports are required to read the 12 operands needed by the three SIMD operations performed in the Vector Pointers Datapath 130.

Similarly, the four results generated from each of the SIMD operations can be concatenated and placed into the same register in the VPR 140, so that only three write ports are required to store the twelve results from the three SIMD operations executed within the Vector Pointers Datapath 130. Each functional unit (FU) 141–143 within the Vector Pointers Datapath 130 comprises, for example, an ALU that performs arithmetic, logic, shift, rotate, bit manipulation, and select operations on the contents of the VPR 140; a second optional operand can be specified by the SIMD instruction (an "immediate" or an "implicit" operand), or can be obtained from a special register (e.g., a scalar register, a register with multiple elements) or from a second VPR. Consequently, a plurality of 4-element SIMD instructions can be executed simultaneously at any cycle within this hardware organization, one in each of the several SIMD computational blocks.

The contents of the VPR 140 are typically updated according to the sequence of VER 150 registers needed in the computations performed in the Vector Computations Datapath 110, so vector pointer update operations can be specified in the same SIMD instruction that controls the Vector Computations Datapath 110. For example, a SIMD multiplication instruction may specify that the registers in the VPR 140 are incremented by a given value, so that the set of values extracted from the VER 150 the next time the same SIMD multiplication instruction is executed (normally as part of a computational loop) corresponds to the four registers whose indexes are incremented by the given value with respect to the indexes used in the previous iteration of the same instruction.

Additional hardware support in the Vector Pointers Datapath 130 enables the implicit management of "circular buffers" inside the VER 150. That is, when the contents of the VPR 140 exceed a predefined value (the "limit" of the buffer), such a VPR 140 is set to another predefined value (the "base" of the buffer). In other words, vector pointer values can be constrained to a range of values that correspond to the size and location of the circular buffer inside the VER 150.

The contents of a register within the VPR 140 can be transferred into the VER 150. Similarly, the contents of a VER 150 register can be transferred into the VPR 140. A suitable size adjustment operation may be used in conjunction with these transfer operations.

The operation of the entire hardware organization described in this invention can be controlled with a single long-instruction word (LIW) that specifies the plurality of SIMD operations performed simultaneously, as is commonly practiced in the art, an approach usually referred to as Very Long Instruction Word (VLIW). Alternatively, the SIMD units in this hardware organization can be controlled by independent instructions, as is the case in a superscalar processor organization, with suitable interlocking mechanisms to ensure the coordinated operation of the SIMD units, and the coordinated transfer of data across the SIMD units.

The resulting organization offers much more flexibility and computing capability for the execution of signal processing algorithms than the existing state-of-the-art for DSP's. The combination of SIMD stages in cascade allows the simultaneous execution of arithmetic/logic operations on vector data elements together with arithmetic/logic operations updating the contents of VPR 140, including the manipulation of vector element data in a very flexible manner. All these operations can be specified through a single SIMD instruction whenever the operations in the Vector Pointers Datapath 130 are implied by the operations performed in the Vector Computations Datapath 110. Alternatively, the operations can be specified through separate SIMD instructions whenever the operations in each datapath are independent.

It should be appreciated that the actual operations that may be performed in any of the datapaths are determined by the specific applications wherein the invention is utilized, and thus they would include any logical and arithmetic operation needed by the applications that would run on the particular processor.

Figure 2:
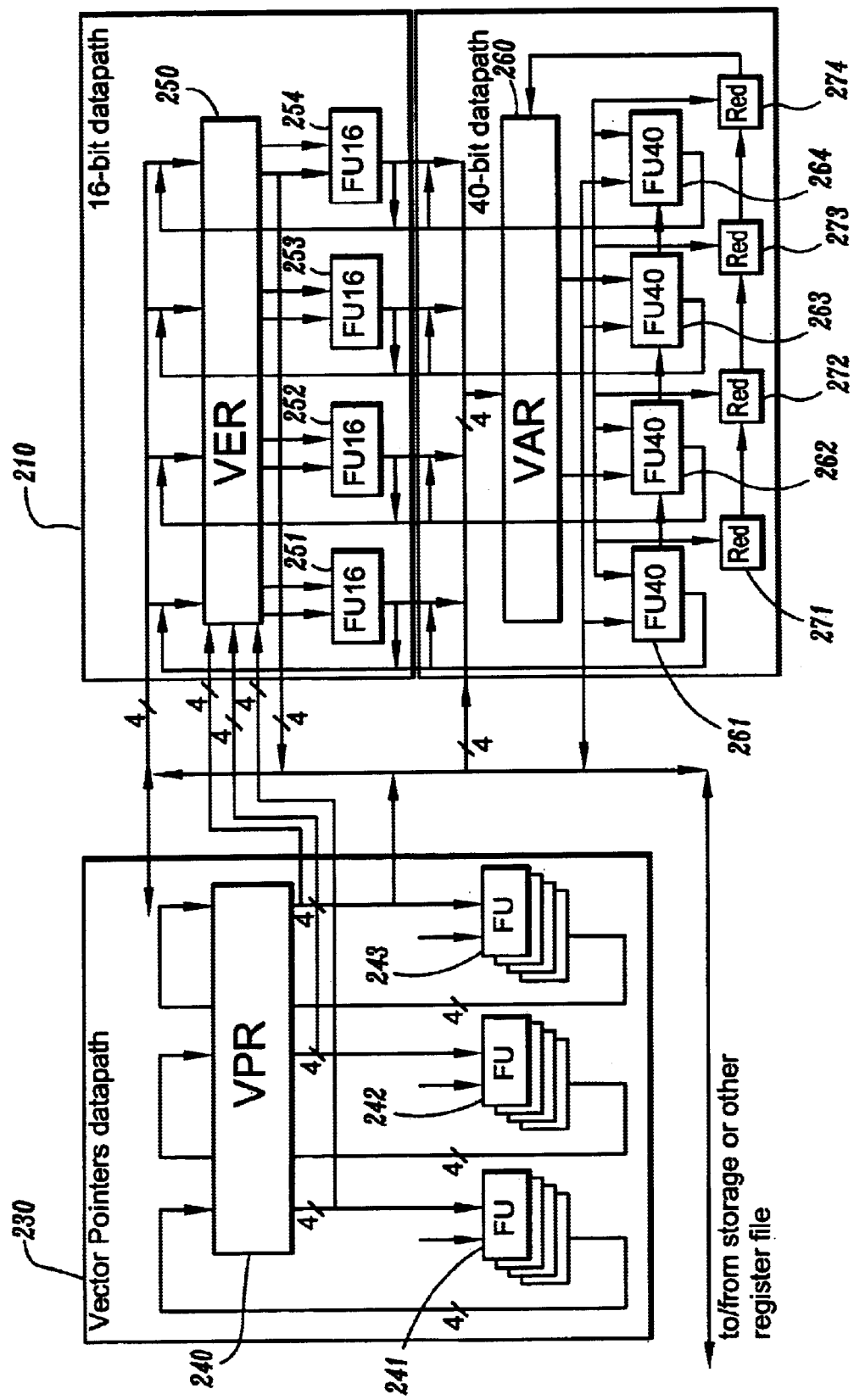

As will be obvious to those skilled in the art, other organizations of the Vector Computations Datapath 110 may be used in various embodiments of this invention. As illustrated in FIG. 2, for example, the Vector Computations Datapath 110 may comprise separate 16-bit and 40-bit datapaths connected in cascade, each one with its own register file. This organization is disclosed in "Digital Signal Processor with Cascaded SIMD Organization," U.S. patent application Ser. No. 10/456,793, which claims priority from a provisional application filed Jun. 26, 2002.

Referring to FIG. 2, a 16-bit datapath 210 performs four operations in SIMD fashion on 16-bit data values obtained from a Vector Element Register File (VER) 250, generating four intermediate results. The VER 250 is capable of delivering 8 operands and receiving 4 values every cycle.

The four results generated in the 16-bit datapath 210 can be placed into the register file of the same 16-bit datapath 210 (i.e., VER 250), or can be placed into a register file of the 40-bit datapath 220 wherein each element is 40-bits wide (herein called Vector Accumulator Register File (VAR) 260). Each functional unit FU16 251–254 within the 16-bit datapath 210 comprises, for example, a 16-bit by 16-bit multiplier and a 16-bit ALU that performs arithmetic, logic, shift, bit manipulation, and select operations on the contents of the 16-bit data. Four 16-bit data elements can be transferred from memory into the VER 250, as well as four 16-bit data elements can be transferred from VER 250 to memory.

A Vector Pointers Datapath 230 is connected to the 16-bit Datapth 210, and may incorporate the arbitrary vector addressing technique disclosed in "Vector Register File with Arbitrary Addressing," U.S. patent application Ser. No. 09/514,497, filed Feb. 29, 2000, or some other register file structure that enables flexible (i.e., indirect) access to a large number of operands used in the 16-bit SIMD datapath 210 (not constrained by encoding space in the instructions).

The sets of data elements used by a 16-bit SIMD instruction are selected arbitrarily among any of the registers in VER 250, in any order, as specified by the contents of Vector Pointer Registers (VPR) 240. Each vector pointer register in the VPR 240 contains four indexes into the VER 250, thereby selecting four arbitrary registers in the VER 250. Two vector pointer registers are used to read data from the VER 250, and a third vector pointer register is used to specify where to place data into the VER 250.

Meanwhile, the 40-bit datapath 220 simultaneously performs four operations in SIMD fashion on 40-bit values obtained from the VAR 260, generating four intermediate results. The VAR 260 is capable of delivering 8 operands and receiving 4 values every cycle. The operands VAR 260 as groups of four values concatenated in the same register, so that only two read ports are required to read the 8 operands needed in a SIMD operation. Similarly, the four results generated from a SIMD operation are concatenated and placed into the same register in the VAR 260, so that a single write port is required to store the four results. Alternatively, the four results generated in the 40-bit datapath 220 can be directly placed into the register file of the 16-bit datapath 210, whenever the operation performed includes a size-reduction transformation such as truncation, rounding, saturation, bit extraction, or combinations thereof. Each functional unit FU40 261–264 within the 40-bit datapath 220 comprises, for example, a 40-bit ALU that performs arithmetic logic, shift, and select operations on the contents of the 40-bit datapath 220. Moreover, the same functional units FU40's 261–264 or some additional dedicated hardware (denoted as Red 271–274) may be used to combine four values into a single result (an operation known as reduction), placing the result in one element of a VAR 260 (for example, the rightmost element), or some other dedicated register.

The Vector Pointer Datapath 230 operates on values whose size (i.e., number of bits) is determined by the number of entries in the VER 250. In other words, the range of each operand in the Vector Pointers Datapath 230 should be large enough to access any of the registers in the VER 250. The VPR 240 registers provide the indexes used to access the contents of the VER 250. The Vector Pointer Datapath 230 performs up to three SIMD operations, with four primitive operations per SIMD operation, on data values obtained from the VPR 240, generating up to 12 results. The VPR 240 is capable of delivering 12 operands and receiving 12 values every cycle. The operands are read from the VPR 240 as groups of four values concatenated in the same register, so that only three read ports are required to read the 12 operands needed by the three SIMD operations performed in the Vectors Pointers Datapath 230.

Similarly, the four results generated from each of the SIMD operations are concatenated and placed into the same register in the VPR 240, so that only three write ports are required to store the twelve results from the three SIMD operations executed within the Vector Pointers Datapath 230. Each functional unit FUP 241–243 within the Vector Pointers Datapath 230 comprises, for example, an ALU that performs arithmetic, logic, shift, rotate, bit manipulation, and select operations on the contents of the VPR 240. Each one of these operations uses one operand obtained from one of the elements in the VPR 240; a second optional operand can be specified by the SIMD instruction (an "immediate" or an "implicit" operand), or can be obtained from a special register or another VPR.

Consequently, a plurality of 4-element SIMD instructions can be executed simultaneously at any cycle within this entire hardware organization, one in each of the several SIMD computational blocks. Data can be transferred to/from memory directly into the VER 250, the VAR 260, and the VPR 230.

Further functionality and parallelism is possible when additional resources are included in the hardware organization described in this invention. For example, a third read port in the VAR 260 would allow performing a store operation that transfers the contents of a register in the VAR 260 to memory, or a move operation that transfers the contents to another register file, at the same time that the other two read ports are used to access the operands required for a 40-bit SIMD operation.

Although FIG. 2 shows datapaths of widths 16-bits and 40-bits, alternative embodiments of this invention may include other widths, as determined by the requirements of a specific application. In practice, the width of the data in the SIMD datapaths may be any pair of values. An appropriate width-extension operation may be performed on results from a narrower datapath before such results are placed in the register file of a wider datapath, and an appropriate size-reduction operation may be performed on the results from a wider datapath when they are placed on a narrower datapath.

A typical use of this organization is for computing 16-bit multiply operations in the 16-bit datapath 210, thereby generating 32-bit results, followed by 40-bit accumulate operations in the 40-bit datapath 220. For this computation, 16-bit data values are transferred from memory into the VER 250, multiplication operations are performed in the 16-bit datapath 210 and the 32-bits results are placed into the VAR 260 after an expansion to 40-bits (such as a sign-extension or zero-extension). 40-bit data from the VAR 260 are added (accumulated), and results are placed back into the VAR 260. Upon completion of a series of accumulation operations, final results are transferred from the VAR 260 to memory, either as 40-bit values or as 32-bit values, for example, through an operation that reduces the size of the data values (such as truncation, rounding, saturation, bit extraction, or combinations thereof). Results can also be transferred from the VAR 260 to the VER 250 as 16-bit values, for example, through an operation that reduces the size of the data values to 16-bits, such as truncation, rounding, saturation, bit extraction, or combinations thereof.

The resulting organization offers much more flexibility and computing capability for the execution of algorithms than the existing state-of-the-art for digital processors. The combination of three SIMD stages in cascade allows the simultaneous execution of up to 8 vector computational arithmetic/logic operations together with up to 12 arithmetic/logic operations updating the contents of the VPR 240. All these operations can be specified through two SIMD instructions whenever the operations in the Vector Pointer Datapath 230 are implied by the operations performed in the 16-bit and 40-bit datapaths. Alternatively, all the operations can be specified through three SIMD instructions whenever the operations in each datapath are independent.

It should be appreciated that the actual operations that may be performed in any of the datapaths are determined by the specific application wherein the invention is utilized, and thus they would include any logical and arithmetic operation needed by the applications that would run on the particular processor.

As will be evident to one skilled in the art, any combination of known or later developed register file structures may be used to implement the present invention. For example, both the 16-bit and the 40-bit datapaths may contain a vector register file with arbitrary addressing, as disclosed in U.S. patent application Ser. No. 09/514,497, so that vector pointer registers can be used to access the contents of the register files in both datapaths. In such a case, a single vector pointer datapath could contain SIMD units to update the vector pointer registers used to access the contents of the VAR 260, in a similar manner to those SIMD units required to update the VPR 240 used to access the VER 250 in an embodiment of the invention described herein. Alternatively, a second vector pointer datapath tailored to the size of the register file in the 40-bit datapath can be used specifically to access the registers in that datapath. Furthermore, register files included in a Vector Pointers Datapath may incorporate any known or later developed file structure practiced in the art.

Similarly, in order to provide the eight operands required by the SIMD operations in the 16-bit datapath, and to save the four values generated by SIMD operations, the 16-bit register file (i.e., the VER 250) can be organized in other ways that are currently practiced in the art for these purposes, which may differ in the flexibility in data manipulation that can be achieved. For example, the 16-bit register file may consist of four smaller register "banks," wherein each such smaller register bank has two read and one write port. Each one of these register banks provides the data for only one of the functional units in the 16-bit SIMD datapath. This approach requires that each set of four values used in one 16-bit SIMD operation be properly distributed across the four register banks, prior to the use of these values, in the order in which the values will be used by the SIMD operation. Similarly, the four values to be placed at once in the register file must be distributed across the register banks. In this case, each element from a Vector Pointer Register is used to access only the 16-bit data elements within one bank, in pre-assigned manner; the leftmost element from the Pointer Register accesses the leftmost bank, the second leftmost element accesses the second leftmost bank, and so on.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for processing digital signal information using a processor having a plurality of datapaths connected in cascade, the plurality of datapaths including at least one vector pointers datapath and at least one vector computational datapath, comprising the steps of:

executing a SIMD instruction in one of the at least one vector pointers datapath for determining operands and data destination of at least one instruction to be executed in at least one of the at least one vector computational datapath; and executing a SIMD instruction in one of the at least one vector computational datapath concurrently with the SIMD instruction executing in the vector pointers datapath.

2. The method of claim 1, wherein each of the plurality of datapaths includes its own register file.

3. The method of claim 2, wherein results of the SIMD instruction executed in the vector pointers datapath are stored in the register file of the same datapath.

4. The method of claim 3, wherein the results stored in the register file include a plurality of indexes into a register file of one of the at least one vector computational datapath.

5. The method of claim 1, wherein the SIMD instruction executed in the vector pointers datapath is an explicit operation.

6. The method of claim 5, wherein the explicit operation includes an arithmetic or a logic operation using at least one register of the register file of the vector pointers datapath.

7. The method of claim 6, wherein the explicit operation also uses other operands obtained from other registers, either scalar or with multiple elements, from other register file structures in the at least one vector pointers datapath.

8. The method of claim 6, wherein the explicit operation includes an arithmetic or a logic operation using two registers from the register file of the vector pointers datapath.

9. The method of claim 1, wherein the SIMD instruction executed in the vector pointers datapath is an implicit operation.

10. The method of claim 9, wherein the implicit operation is an update operation that adds a value to each element of a register from a register file of the vector pointers datapath.

11. The method of claim 10, wherein the value added to each of the elements is a constant or a value specified by an instruction.

12. The method of claim 9, wherein the implicit operation is an arithmetic or a logic operation that uses content of a register from a register file of the vector pointers datapath as a first operand and an implicit value, an explicit value, or the content of a specific register as the second operand.

13. The method of claim 1, wherein the vector pointers datapath enables the management of circular buffers for a register file of the at least one vector computational datapath.

14. The method of claim 1, wherein the width of a first vector computational datapath differs from the width of a second vector computational datapath.

15. The method of claim 14, wherein the width of the first vector computational datapath is less than the width of the second vector computational datapath.

16. The method of claim 9, wherein the width of the first vector computational datapath is 16 bits and the width of the second vector computational datapath is 40 bits.

17. The method of claim 15, wherein results from operations performed in the first vector computational datapath are placed in a register file of the second vector, computational datapath.

18. The method of claim 17, wherein the results placed in the register file of the second vector computational datapath are operated upon in the second vector computational datapath.

19. The method of claim 17, wherein the results placed in the register file of the second vector computational datapath are zero-extended or sign-extended to have a bit-length equal to the width of the second vector computational datapath.

20. The method of claim 15, wherein results of an operation-performed in the second vector computational datapath are transferred to memory.

21. The method of claim 15, wherein results of an operation performed in the second vector computational datapath are transferred to a register file of the first vector computational datapath.

22. The method of claim 15, wherein data transferred to memory or to the register file of the first vector computational datapath are size reduced.

23. The method of claim 22, wherein the size reduction includes at least one of saturation, rounding, truncation, and bits extraction.

24. The method of claim 2, wherein the register file of a first vector computational datapath is a multiported register file with arbitrary addressing and whose content are accessed indirectly using a register from a register file of the vector pointers datapath.

25. The method of claim 2, wherein the register file of a second vector computational datapath is a multiported register file with arbitrary addressing and whose contents are accessed indirectly using a register from a register file of the vector pointers datapath.

26. The method of claim 2, wherein at least one of the register files is organized as a plurality of register banks.

27. The method of claim 26, wherein each of the register banks is connected to a functional unit.

28. The method of claim 1, wherein dedicated hardware is used to combine a plurality of values into a single result placed into a dedicated register.

29. The method of claim 1, wherein the plurality of datapaths are controlled by a single long-instruction word (LIW).

30. The method of claim 29, wherein all basic instructions in one LIW are fetched at the same time.

31. The method of claim 29, wherein all basic instructions in one LIW are issued fur execution at the same time.

32. The method of claim 1, wherein the plurality of datapaths are controlled by a plurality of instructions, each of which is dispatched for execution only when the resources required by the instruction are available.

33. The method of claim 32, wherein hardware interlocking mechanisms are used to detect when the resources required by the instruction, including results generated by earlier instructions, are available.

34. A digital signal processor, comprising:
   at least one vector pointers datapath for executing first SIMD instructions for determining operands and data destination of an at least one instruction to be executed in at least one vector computational datapath; and
   at least one vector computational datapath capable of concurrently executing second SIMD instructions with the first SIMD instructions, executing in the at least one vector pointers datapath.

35. A program storage device readable by a machine, tangibly embodying a program of instructions executable on the machine to perform method steps for processing digital signal information using a processor having a plurality of datapaths connected in cascade, the plurality of datapaths including at least one vector pointers datapath and at least one vector computational datapath, the method steps comprising:
   executing a SIMD instruction in one of the at least one vector pointers datapath for determining operands and data destination of at least one instruction to be executed in at least one of the at least one vector computational datapath; and
   executing a SIMD instruction in one of the at least one vector computational datapath concurrently with the SIMD instruction executing in the vector pointers datapath.

* * * * *